(12) United States Patent
Fahrenkrug et al.

(10) Patent No.: US 8,820,059 B1
(45) Date of Patent: Sep. 2, 2014

(54) MOUNTING ASSEMBLY FOR REDUCTANT INJECTOR WITH THERMAL ISOLATION AND SEALING GASKET

(71) Applicant: Caterpillar Inc., Peoria, IL (US)

(72) Inventors: Matthew F. Fahrenkrug, Chillicothe, IL (US); Jason W. Hudgens, Washington, IL (US); Richard A. Crandell, Holly Springs, NC (US)

(73) Assignee: Caterpillar Inc., Peoria, IL (US)

( * ) Notice: Subject to any disclaimer, the term of this patent is extended or adjusted under 35 U.S.C. 154(b) by 9 days.

(21) Appl. No.: 13/774,520

(22) Filed: Feb. 22, 2013

(51) Int. Cl.
*F01N 3/00* (2006.01)
*F01N 3/10* (2006.01)
*F01N 3/02* (2006.01)
*F02M 69/04* (2006.01)

(52) U.S. Cl.
CPC .................................... *F02M 69/04* (2013.01)
USPC .................... 60/303; 60/295; 60/301; 60/311

(58) Field of Classification Search
USPC .................... 60/286, 295, 301, 303, 311, 324
See application file for complete search history.

(56) References Cited

U.S. PATENT DOCUMENTS

| | | | |
|---|---|---|---|
| 6,513,323 B1 | 2/2003 | Weigl et al. |
| 7,500,356 B2 | 3/2009 | Hirata et al. |
| 7,673,446 B2 | 3/2010 | Zemskova et al. |
| 7,832,200 B2 | 11/2010 | Kesse et al. |
| 7,971,428 B2 | 7/2011 | Kimura et al. |
| 8,069,651 B2 | 12/2011 | Crosby et al. |
| 8,096,112 B2 | 1/2012 | Dalton |
| 8,151,558 B2 | 4/2012 | Robel et al. |
| 8,171,722 B2 | 5/2012 | Rodman et al. |
| 8,209,964 B2 | 7/2012 | Kesse |
| 8,341,949 B2 | 1/2013 | Tarabulski |
| 2004/0265198 A1 | 12/2004 | Biswas et al. |
| 2008/0155973 A1 | 7/2008 | Maruyama et al. |
| 2008/0202096 A1 | 8/2008 | Driscoll et al. |
| 2009/0056311 A1 | 3/2009 | Crosby et al. |
| 2009/0084095 A1 | 4/2009 | Dalton |
| 2009/0188235 A1 | 7/2009 | Robel et al. |
| 2009/0193794 A1 | 8/2009 | Robel et al. |
| 2009/0205321 A1 | 8/2009 | Delvecchio et al. |
| 2009/0266058 A1 | 10/2009 | Kesse et al. |
| 2009/0266059 A1 | 10/2009 | Kesse et al. |
| 2009/0293451 A1 | 12/2009 | Kesse |
| 2009/0293452 A1 | 12/2009 | Tarabulski |

(Continued)

OTHER PUBLICATIONS

Cummins, Inc., "Diesel Exhaust Fluid (DEF) Dosing Valve Mounting Hardware Selection," downloaded from https://quickserve.cummins.com/qs2/pubsys2/xmllen/install_inst14907971.html on Mar. 20, 2012; last updated Jun. 16, 2011, 6 pp.

*Primary Examiner* — Audrey K Bradley

(74) *Attorney, Agent, or Firm* — Leydig, Voit & Mayer, Ltd.

(57) ABSTRACT

A mounting assembly for an injector is located in a curved portion of an exhaust line having an exhaust flow from an upstream end to a downstream end. The mounting assembly includes an indent extending at least partially into the exhaust line curved portion and disposed in the exhaust flow. The downstream wall has an interior surface oriented to substantially face the exhaust line downstream end. A recess extends from the downstream wall in a direction away from the exhaust line downstream end, and a recess aperture is formed in the recess and configured to fluidly communicate with the injector. The recess reduces the amount of exhaust heat reaching the injector tip.

20 Claims, 7 Drawing Sheets

(56) References Cited

U.S. PATENT DOCUMENTS

| | | |
|---|---|---|
| 2010/0132344 A1 | 6/2010 | Peters |
| 2010/0139260 A1 | 6/2010 | Rodman et al. |
| 2010/0146948 A1 | 6/2010 | DaCosta et al. |
| 2010/0146951 A1 | 6/2010 | Gaudin et al. |
| 2010/0154393 A1 | 6/2010 | Silver et al. |
| 2010/0212292 A1 | 8/2010 | Rusch et al. |
| 2011/0079003 A1 | 4/2011 | Sun et al. |
| 2011/0095105 A1 | 4/2011 | Mortensen et al. |
| 2011/0126529 A1 | 6/2011 | Park |
| 2012/0096833 A1 | 4/2012 | Tan et al. |
| 2013/0000281 A1 | 1/2013 | Merchant et al. |
| 2013/0219871 A1* | 8/2013 | Crandell et al. ............ 60/295 |

* cited by examiner

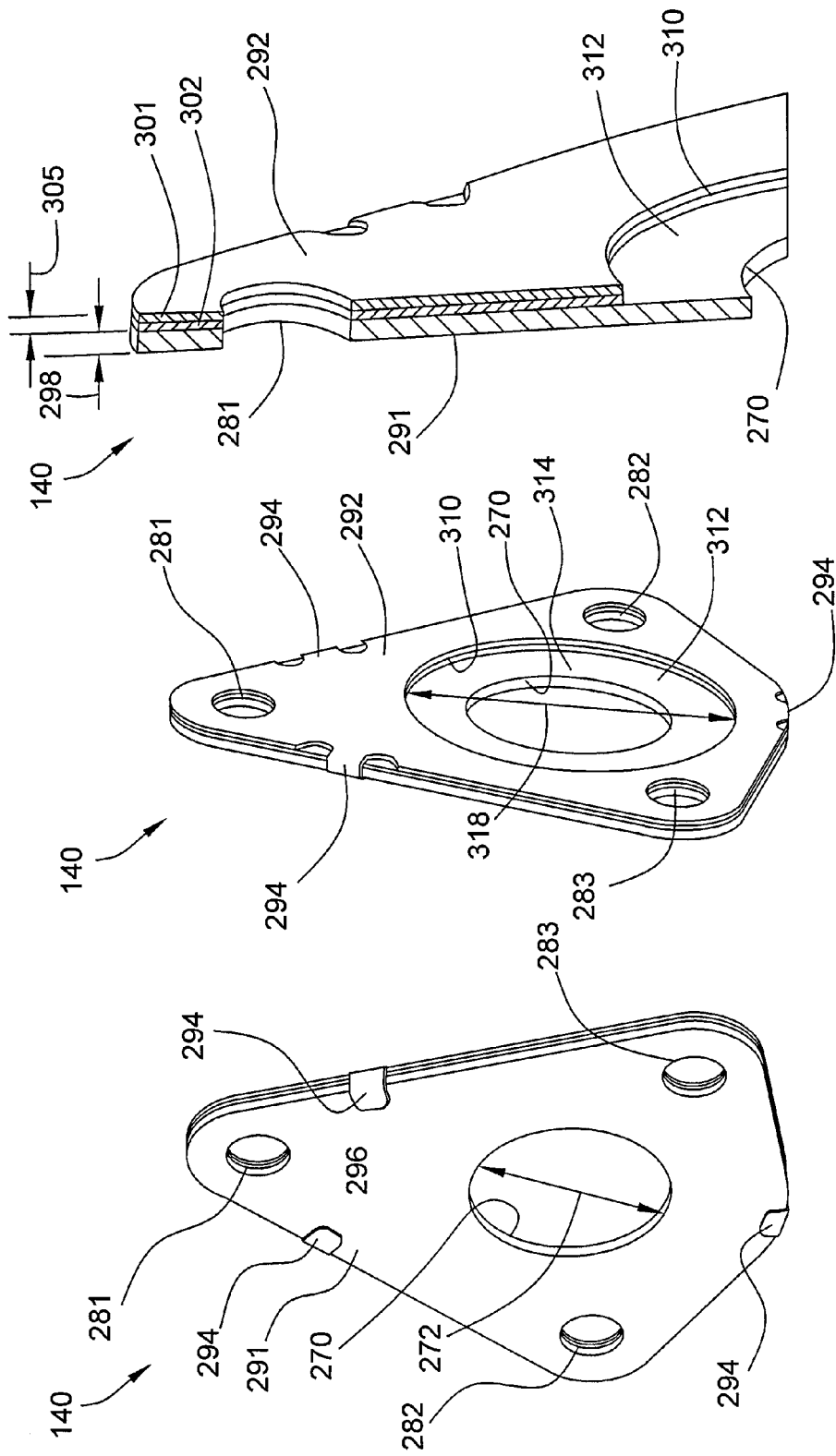

MOUNTING ASSEMBLY FOR REDUCTANT INJECTOR WITH THERMAL ISOLATION AND SEALING GASKET

TECHNICAL FIELD

This patent disclosure relates, generally, to an engine exhaust after-treatment system, and, more particularly, to a mounting assembly for a reductant injector of an engine exhaust after-treatment system.

BACKGROUND

Engines, such as, internal combustion engines, including diesel engines, gasoline engines, gaseous fuel-powered engines, for example, exhaust a complex mixture including different types of constituent components, including gaseous compounds, such as nitrogen oxides ($NO_x$), and solid particulate matter, also known as soot. Exhaust emission standards have become increasingly more stringent, and the amount of $NO_x$ and soot emitted to the atmosphere by an engine can be regulated depending on the type of engine, size of engine, and/or class of engine.

In order to ensure compliance with the regulation of $NO_x$, some engine manufacturers have implemented a strategy called selective catalytic reduction (SCR). SCR is a process where a gaseous or liquid reductant, most commonly urea, is injected into the exhaust stream of an engine and is absorbed onto a substrate. The reductant reacts with NO in the exhaust gas to form water ($H_2O$) and nitrogen ($N_2$). Although SCR can be effective, it is most effective when the reductant is maintained below certain threshold temperatures.

SCR systems often include an injector for spraying the reductant. Under unfavorable conditions, the exhaust gas temperatures at the region where the injector introduces the reductant into the exhaust can reach more than 500° C. This high temperature may adversely impact the efficacy of the reductant injected into the exhaust stream and can harm the injector itself.

U.S. Pat. No. 6,513,323 is entitled, "Valve Seat Device For a Metering Valve of an Exhaust Treatment Station." The '323 patent is directed to an uncontrolled heat pipe used in a valve seat device for transferring the waste heat from the exhaust gas acting on a metering valve to a condensation zone which is situated in a lower temperature environment, whereby the metering valve is cooled sufficiently to prevent a chemical change of a reducing agent which otherwise can be caused by high temperatures.

It will be appreciated that this background description has been created by the inventors to aid the reader, and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims, and not by the ability of any disclosed feature to solve any specific problem noted herein.

SUMMARY

The present disclosure is directed to, in one embodiment, an injector mounting assembly for an injector of an engine exhaust after-treatment system. The injector includes a mounting end with a plurality of mounting feet disposed in spaced relationship to each other, a tip with a nozzle disposed between the plurality of mounting feet, and a sealing plate defining a nozzle opening and mounted to the tip such that the nozzle opening is aligned with the nozzle. The plurality of mounting feet each includes a distal mounting surface.

The injector mounting assembly includes an exhaust line and a gasket. The exhaust line defines a passageway having an upstream end and a downstream end in fluid communication with the upstream end. The exhaust line is adapted to receive an exhaust flow from an engine at the upstream end and to discharge the exhaust flow from the downstream end. The exhaust line includes an exterior surface having a mounting surface with a plurality of mounting bosses projecting therefrom and a sealing surface defining an injector passage. The plurality of mounting bosses each includes a distal mounting face. The plurality of mounting bosses and the injector passage are configured such that, when the injector is mounted to the exhaust line, the distal mounting surface of each of the plurality of mounting feet is respectively aligned with a corresponding distal mounting face of the plurality of mounting bosses and the injector passage is in fluid communication with the nozzle of the injector such that reductant emitted from the nozzle of the injector enters the exhaust line and travels in an exhaust flow direction toward the downstream end.

The gasket is mounted to the exhaust line. The gasket defines a nozzle aperture therein. The nozzle aperture is substantially aligned with the injector passage of the exhaust line. The gasket is configured such that, when the injector is mounted to the exhaust line: the gasket is interposed between the distal mounting surface of each of the plurality of mounting feet and the corresponding distal mounting face of the plurality of mounting bosses of the exhaust line; the gasket is interposed between, and in sealing engagement with, the sealing surface of the exhaust line and the sealing plate of the injector; and the nozzle aperture of the gasket is aligned with the nozzle of the injector.

In another embodiment, an engine exhaust after-treatment system for a power system of a machine includes an exhaust line, a gasket mounted to the exhaust line, and a reductant injector mounted to the exhaust line with the gasket interposed therebetween. The exhaust line defines a passageway having an upstream end and a downstream end in fluid communication with the upstream end. The exhaust line is adapted to receive an exhaust flow from an engine at the upstream end and to discharge the exhaust flow from the downstream end. The exhaust line includes an exterior surface having a mounting surface with a plurality of mounting bosses projecting therefrom and a sealing surface defining an injector passage. The plurality of mounting bosses each includes a distal mounting face.

The gasket defines a nozzle aperture therein. The nozzle aperture is substantially aligned with the injector passage of the exhaust line.

The reductant injector includes a mounting end having a plurality of mounting feet disposed in spaced relationship to each other, a tip with a nozzle disposed between the plurality of mounting feet, and a sealing plate defining a nozzle opening and mounted to the tip such that the nozzle opening is aligned with the nozzle. The plurality of mounting feet each includes a distal mounting surface. The reductant injector is mounted to the exhaust line such that the distal mounting surface of each of the plurality of mounting feet is respectively aligned with a corresponding distal mounting face of the plurality of mounting bosses and the nozzle of the reductant injector extends through the nozzle aperture of the gasket and is in fluid communication with the injector passage of the exhaust line such that reductant emitted from the nozzle of the reductant injector enters the exhaust line and travels in an exhaust flow direction toward the downstream end.

The gasket is configured such that the gasket is interposed between the distal mounting surface of each of the plurality of mounting feet and the corresponding distal mounting face of the plurality of mounting bosses of the exhaust line. The gasket is interposed between, and in sealing engagement with, the sealing surface of the exhaust line and the sealing plate of the reductant injector.

Further and alternative aspects and features of the disclosed principles will be appreciated from the following detailed description and the accompanying drawings. As will be appreciated, the embodiments of an injector mounting assembly and an engine exhaust after-treatment system for a power system of a machine disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS

FIG. 8 is a perspective view of an embodiment of a gasket suitable for use with principles of the present disclosure, illustrating an injector mating surface of a thermal insulation layer of the gasket.

FIG. 9 is a perspective view of the gasket of FIG. 8, illustrating a shim layer of the gasket.

FIG. 10 is an enlarged, detail view taken from FIG. 9.

DETAILED DESCRIPTION

In one aspect of the present disclosure, embodiments of an injector mounting assembly for an injector of an engine exhaust after-treatment system suitable for use in a power system are disclosed herein. In exemplary embodiments described herein, an engine exhaust after-treatment system includes an exhaust line in which a mounting assembly for a reductant injector is disposed. The mounting assembly includes a gasket which can provide thermal isolation between the exhaust line and the injector and provide a sealing relationship between the exhaust line and the reductant injector. Additional features are disclosed which are configured to protect the injector and related components from high temperatures generated by the engine exhaust.

Figure 1:
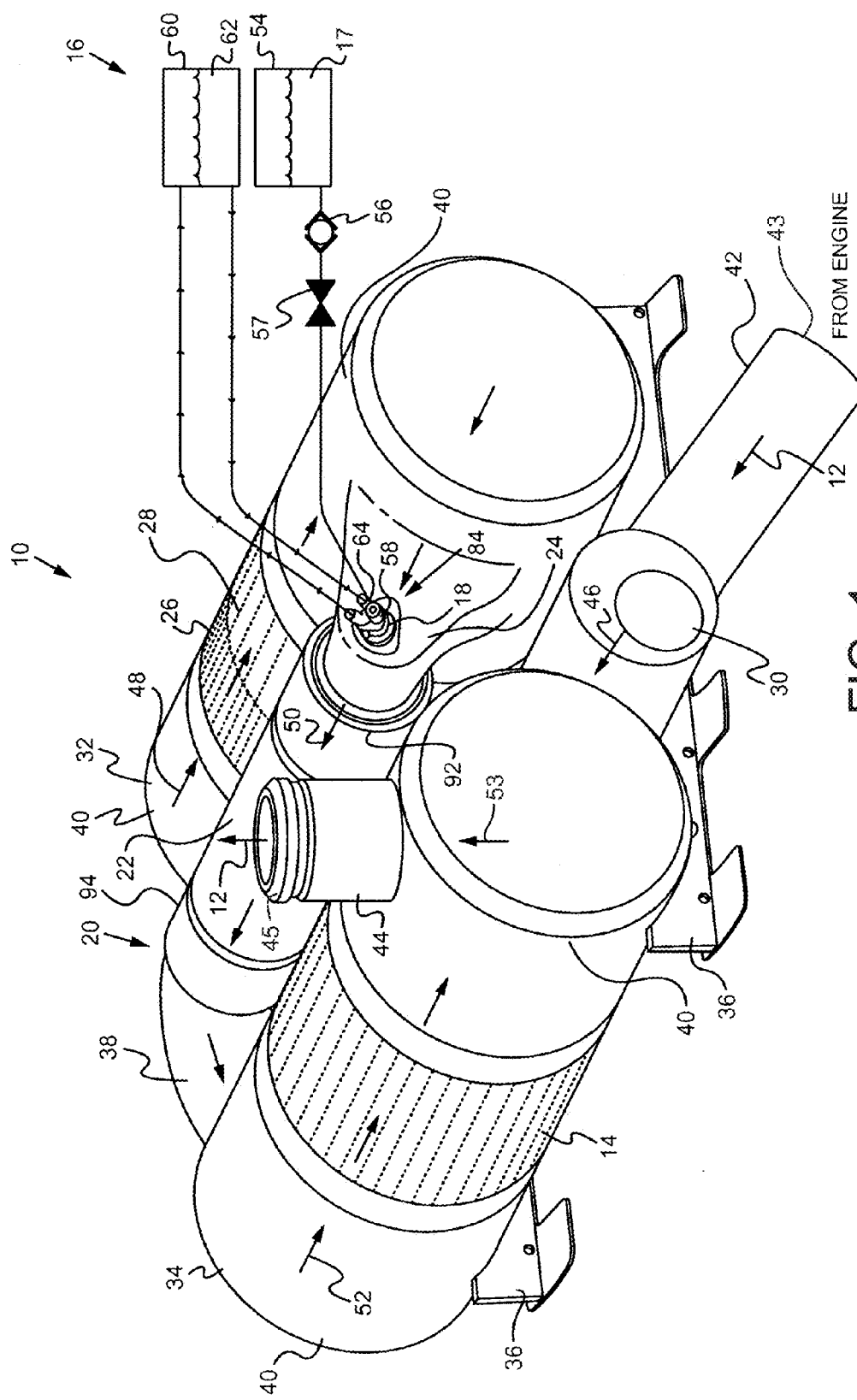
FIG. 1 is a diagrammatic view of an embodiment of an engine exhaust after-treatment system constructed in accordance with principles of the present disclosure.

Turning now to the Figures, there is shown in FIG. 1 an exemplary embodiment of an engine exhaust after-treatment system 10 constructed in accordance with principles of the present disclosure. The engine exhaust after-treatment system 10 is adapted to receive an exhaust flow 12 from an engine or power system. In different embodiments, the engine can be any type of engine (e.g., internal combustion, gas, diesel, gaseous fuel, natural gas, propane, etc.), any suitable size with any number of cylinders, and in any configuration (e.g., "V," in-line, radial, etc.). The engine can be used to power any machine or other device, including, for example, on-highway trucks or vehicles, off-highway trucks or machines, earth moving equipment, generators, aerospace applications, locomotive applications, marine applications, pumps, stationary equipment, or other engine powered applications.

The engine exhaust after-treatment system 10 can be adapted to reduce constituents in an exhaust flow 12 from an engine. In embodiments, the engine exhaust after-treatment system 10 is adapted to retain and inject a reductant into the exhaust flow 12 of an engine moving through an exhaust passageway defined by an exhaust line 20 at a location upstream of a catalyst substrate of an SCR device 14 disposed in the exhaust passageway. In one example, nitrogen oxide ($NO_x$) within the exhaust flow 12 passes through the catalyst substrate of the SCR device 14 and reacts with the reductant to form $H_2O$ and $N_2$.

The illustrated engine exhaust after-treatment system 10 includes the SCR device 14 and a reductant system 16. The SCR device 14 can include a catalyst material disposed on a substrate. The catalyst material can be adapted to reduce an amount of $NO_x$ in the exhaust flow 12 by using a reductant 17. The substrate can be any suitable material, including cordierite, silicon carbide, other ceramic, or metal. The substrate can include a plurality of through-going channels and can form a honeycomb structure. The catalyst substrate can be made from a variety of materials.

For example, the catalyst substrate can include a support material and a metal promoter dispersed within the catalyst support material. The support material can include, for example, at least one of alumina, zeolite, aluminophosphates, hexyluminates, aluminosilicates, zirconates, titanosilicates, and titanates. The metal promoter can include, for example, silver metal (Ag). Combinations of these materials can be used and the support material can be chosen based on the type of fuel used, the reductant used, the air to fuel-vapor ratio desired, and/or for conformity with environmental standards. One of ordinary skill in the art will recognize that numerous other catalyst compositions can be used without departing from the scope of this disclosure.

Further, in other embodiments, multiple catalytic devices can be included in the engine exhaust after-treatment system 10, if desired, including multiple SCR devices and reductant injectors. For example, in embodiments, an ammonia oxidation catalyst (AMOX) can also be included downstream of the SCR device 14 or zone coated on the end of the SCR device 14 to help prevent a condition known as "ammonia slip," which refers to the situation where too much urea is injected into the exhaust flow 12.

The reductant can be any suitable material, including, for example, urea or ammonia, for example. In embodiments, the reductant 17 can comprise a solution of 32.5% urea in water commercially-available from BASF Corp. of Florham Park, N.J., under the trade name Adblue®. The illustrated reductant 17 comprises urea, which decomposes into ammonia ($NH_3$) that is adsorbed or stored in the SCR device 14.

The reductant system 16 includes an injector 18 that introduces the reductant 17 into the exhaust flow 12. The injector 18 can be any suitable injector configured to emit a spray of reductant therefrom and can include springs, washers, cooling passages, injector pins, and other features not shown. In embodiments, the injector 18 can be a dosing module commercially-available from Robert Bosch GmbH of Germany under the trade name Denoxtronic®.

In one example, the SCR device 14 is disposed in the passageway of the exhaust line 20 downstream of the reductant injector 18. The reductant 17, such as, urea or a water/urea mixture, can be sprayed or otherwise advanced into the exhaust flow 12 upstream of the catalyst substrate of the SCR device 14 by the reductant injector 18 such that the reductant 17 emitted from the injector 18 enters the exhaust line 20 and travels in an exhaust flow direction toward the downstream end of the exhaust line 20. The reductant 17 is absorbed onto the surface of catalyst substrate of the SCR device 14 where it can react with $NO_x$ (NO and $NO_2$) in the exhaust flow 12 to form water ($H_2O$) and elemental nitrogen ($N_2$).

In embodiments where the reductant 17 is urea, the urea is decomposed into ammonia ($NH_3$) and, possibly, other chemical species, such as isocyanic acid (HNCO) and solid byproducts. Ammonia may be retained within the SCR device 14. The ammonia stored in the SCR device 14 can reduce the amount of $NO_x$ in the exhaust gases passing through the SCR device 14. Other agents suitable for reducing $NO_x$ can also be injected into the exhaust flow 12 and/or the SCR device 14 if desired. The use of urea as a reducing agent precursor for formation of ammonia may be desirable due to the relative ease of handling urea. In an exemplary practice, the urea is thermally decomposed into ammonia and HCNO. The HCNO then reacts with water on the appropriate catalyst surface (which could be a hydrolysis catalyst or the SCR catalyst itself) to yield carbon dioxide ($CO_2$) and additional ammonia ($NH_3$). The ammonia, in turn, can act as a reducing agent within the SCR device 14.

The use of a hydrolysis catalyst may be desirable to promote the reaction of HNCO with water. In some embodiments, a hydrolysis catalyst (H) may be associated with catalyst substrate of the SCR device 14 to promote even distribution and conversion of urea to ammonia ($NH_3$).

The exhaust flow 12 is introduced to the SCR device 14 via the exhaust line 20, which is adapted to direct the exhaust flow 12 from the engine through the engine exhaust after-treatment system 10. The exhaust line 20 includes a straight conduit 22 and a curved conduit or bend 24 upstream of the straight conduit 22. The injector 18 is mounted in the bend 24. The length of the straight conduit 22 or distance between the injector 18 and the SCR device 14 can be configured to sufficiently space apart the injector 18 and the SCR device 14 to allow the reductant 17 to disperse into the exhaust flow 12 and provide a sufficient dwell time for the reductant 17, including urea, to convert into $NH_3$.

The engine exhaust after-treatment system 10 can also include a diesel oxidation catalyst (DOC) 26, a diesel particulate filter (DPF) 28, and a clean-up catalyst or other exhaust treatment devices upstream or downstream of the SCR device 14. The illustrated engine exhaust after-treatment system 10 shows the DOC 26 upstream of the DPF 28 which, in turn, is upstream of the SCR device 14 such that the exhaust flow 12 travels in an exhaust flow direction from the engine through the DOC 26, then through the DPF 28, past the injector 18, and then through the SCR device 14.

The DOC 26 can be disposed in the passageway of the exhaust line 20 upstream of the DPF 28 and the SCR device 14. The DOC 26 can be provided to help provide a desired concentration of NO to $NO_2$. In embodiments, for example, the reduction process performed by the catalyst substrate of the SCR device 14 may perform more effectively when a concentration of NO to $NO_2$ supplied to the catalyst substrate of the SCR device 14 is about 1:1. In embodiments, the DOC 26 can include a porous ceramic honeycomb structure or a metal mesh substrate coated with a material, for example a precious metal, that catalyzes a chemical reaction to alter the composition of the exhaust. For example, the DOC 26 can include platinum that facilitates the conversion of NO to $NO_2$, and/or vanadium that suppresses the conversion.

The DPF 28 can be disposed in the passageway of the exhaust line 20 upstream of the SCR device 14. The DPF 28 can include a particulate filter adapted to remove soot from the exhaust flow 12 from the engine. It is contemplated that the particulate filter of the DPF 28 can include an electrically conductive or non-conductive coarse mesh metal or porous ceramic honeycomb medium. As the exhaust flow 12 travels through the medium of the DPF 28, particulates may be blocked by and left behind in the medium. Over time, the particulates may build up within the medium and, if unaccounted for, could negatively affect engine performance.

To minimize negative effects on engine performance, the collected particulates may be passively and/or actively removed through a process called regeneration. When passively regenerated, the particulates deposited on the filtering medium may chemically react with a catalyst, for example, a base metal oxide, a molten salt, and/or a precious metal that is coated on or otherwise included within particulate filter of the DPF 28 to lower the ignition temperature of the particulates. Because the DPF 28 may be relatively closely located downstream of the engine, the temperatures of the exhaust flow 12 entering particulate filter of the DPF 28 may be high enough, in combination with the catalyst, to burn away the trapped particulates.

When actively regenerated, heat may be applied to the particulates deposited on the filtering medium to elevate the temperature thereof to an ignition threshold. For this purpose, an active regeneration device 30 may be proximally located upstream of the DPF 28. The active regeneration device 30 can be embodied in the form of a heat source. In embodiments, a combination of passive and active regeneration may be utilized, if desired.

To that end, in embodiments, the engine exhaust after-treatment system 10 can also include a heat source 30 to regenerate the DPF 28. In embodiments, the heat source 30 can embody any suitable device configured to produce heat, such as a burner including a combustion head and a housing to contain a flame, an electric heating element, a microwave device, or other heat source. Heat can also be created by injecting a hydrocarbon source, such as fuel, into the exhaust flow 12 that will exothermically react in the DOC 26. In embodiments, the heat source 30 can also embody operating the engine under conditions to generate elevated temperatures in the exhaust flow 12.

The illustrated DOC 26 and the DPF 28 are housed in a common first canister 32 of the exhaust line 20. The DOC 26 and the DPF 28 can also be housed in separate canisters in other embodiments. The SCR device 14 can be housed in a second canister 34 of the exhaust line 20. The heat source 30, the first canister 32, and the second canister 34 can be arranged in side-by-side parallel orientation on a mount 36, as shown in FIG. 1. The heat source 30, the first canister 32, and the second canister 34 can also be arranged and mounted in other ways in other embodiments.

The exhaust line 20 can also include a second bend 38 downstream of the straight conduit 22 for routing the exhaust flow 12 into the second canister 34. In other embodiments, the second bend 38 can be omitted, and the second canister 34 can be aligned with the straight conduit 22. The first canister 32 and the second canister 34 can also include ends 40 for receiving and delivering the exhaust flow 12 to other portions of the exhaust line 20.

An additional section of the exhaust line 20 (not shown) can route the exhaust flow 12 from the heat source 30 to the first canister 32 receiving end 40. In other embodiments, the heat source 30 can be omitted, and the entering conduit 42 can route the exhaust flow 12 to the first canister 32 receiving end 40.

Thus, the exhaust line 20 is adapted to receive the exhaust flow 12 from an engine at an upstream end 43, direct the exhaust flow 12 through the engine exhaust after-treatment system 10 to reduce the amount of $NO_x$ in the exhaust flow 12, and to discharge the exhaust flow 12 from a downstream end 45. An entering conduit 42 of the exhaust line 20 can include the upstream end 43 which adapted to receive the exhaust flow 12 from the engine and to route the exhaust flow 12 through the engine exhaust after-treatment system 10. The second canister 34, or another end canister, can include an exit port 44 at a downstream end 45 of the exhaust line 20 for the exhaust flow 12 to exit the engine exhaust after-treatment system 10. The downstream end 45 of the exhaust line 20 is in fluid communication with the upstream end 43 thereof through the passageway defined by the exhaust line 20.

The exhaust flow 12 moves downstream in an exhaust flow direction from the upstream end 43 to the downstream end 45 in a generally serpentine path. The exhaust flow 12 passes through the entering conduit 42 and next through the heat source 30, if included, in a first flow direction 46. The exhaust flow 12 can be routed to pass through the first canister 32 in a second flow direction 48 that can be parallel to, and generally opposing, the first flow direction 46. The exhaust flow 12 passes through the DOC 26, the DPF 28, the end 40 of the first canister 32, and through the bend 24. The exhaust flow 12 moves past the injector 18 through the straight conduit 22 in a third flow direction 50 that can be parallel to, and generally opposing, the second flow direction 48. The exhaust flow 12 is routed to pass through the second bend 38 and through the second canister 34 in a fourth flow direction 52 that can be parallel to, and generally aligned the second flow direction 48. Finally, the exhaust flow 12 exits through the exit port 44 at the downstream end 45 in a fifth flow direction 53 that is generally perpendicular to the fourth flow direction 52 and oriented generally vertically upward in the illustrated position.

The reductant system 16 can also include a reductant source 54, a pump 56, and a valve 57. The reductant source 54 can be in fluid communication with the reductant injector 18. The pump 56 can be adapted to selectively deliver the reductant 17 to the reductant injector 18 from the reductant source 54. The reductant 17 is drawn from the reductant source 54 via the pump 56 and delivered to a reductant inlet connection 58 of the injector 18. The valve 57 or pump 56 can be used to control the delivery of the reductant 17.

The reductant system 16 can also include a coolant source 60 in fluid communication with the reductant injector 18. The coolant source 60 can be adapted to deliver coolant 62 from the coolant source 60 to the injector 18 and to receive coolant 62 back from the injector 18 in a closed loop arrangement via coolant port connections 64 of the injector 18. The coolant source 60 can embody the coolant system of the engine or another coolant source 60. The coolant 62 can also be used to cool other parts of the reductant system 16 or the engine exhaust after-treatment system 10. In embodiments, the coolant 62 can also be used to thaw the reductant 17 of the reductant source 54 should it freeze.

In embodiments, the engine exhaust after-treatment system 10 can include a controller in communication with a plurality of sensors (not shown). For example, a controller and one or more sensors (not shown) can be included to control the reductant system 16 and/or the heat source 30.

In embodiments, based on input from each of the sensors, the controller can be adapted to determine an amount of $NO_x$ being produced by the engine, a performance parameter of the SCR device 14 (e.g., a reduction efficiency), a history of the performance parameter (e.g., the reduction efficiency tracked over a period of time), an amount of the reductant 17 remaining within the reductant source 54, a history of the supply level of the reductant 17 (e.g., the amount of the reductant 17 remaining within the reductant source 54 tracked over a period of time), and an amount of the reductant 17 that should be sprayed by reductant injector 18 into the exhaust flow 12 traveling through the passageway of the exhaust line 20 to sufficiently reduce the $NO_x$ present within the exhaust flow 12. The controller can be adapted to regulate the operation of the reductant injector 18 such that an appropriate amount of the reductant 17 is sprayed into the exhaust flow 12 upstream of the SCR device 14. In addition, the controller can be adapted to diagnose deficiencies and/or problems associated with the exhaust system and to adjust the operation of the engine exhaust after-treatment system 10, and/or alert an operator thereof, in response to the diagnosis.

The controller can embody one or more microprocessors, field programmable gate arrays (FPGAs), digital signal processors (DSPs), etc. that include a means for controlling an operation of the power system in response to signals received from the various sensors. Numerous commercially-available microprocessors can be configured to perform the functions of the controller. It should be appreciated that the controller can readily embody a microprocessor separate from that controlling other non-exhaust related power system functions, or that the controller can be integral with a general power system microprocessor and be capable of controlling numerous power system functions and modes of operation. If separate from a general power system microprocessor, the controller of the engine exhaust after-treatment system 10 can be adapted to communicate with the general power system microprocessor via data links or other methods. For example, the controller can be in communication with an engine control module (ECM) or can be included in the ECM. Various other known circuits may be associated with the controller for the engine exhaust after-treatment system 10, including power supply circuitry, signal-conditioning circuitry, actuator driver circuitry (i.e., circuitry powering solenoids, motors, or piezo actuators), communication circuitry, and other appropriate circuitry.

Figure 2:
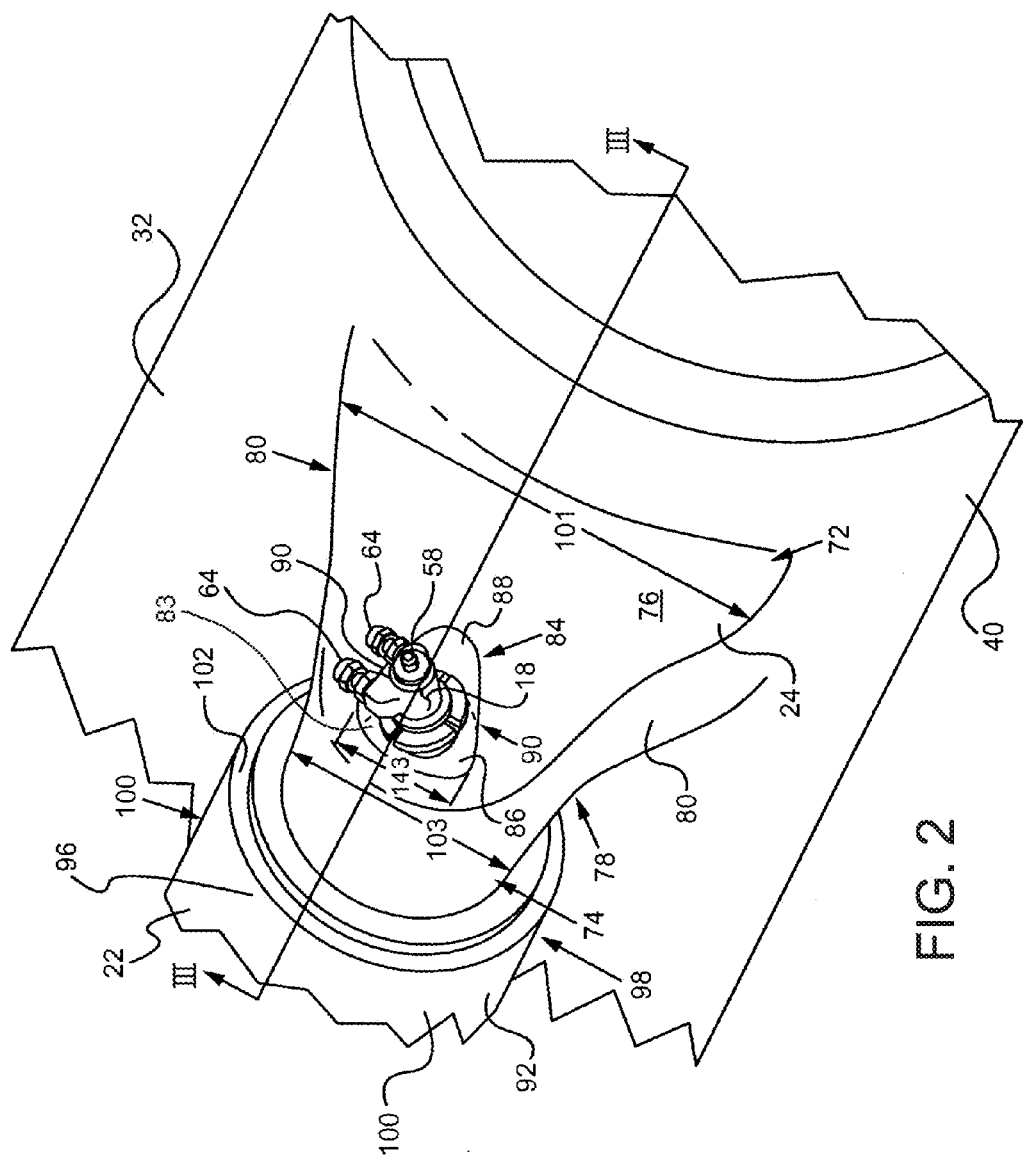
FIG. 2 is an enlarged diagrammatic view of the engine exhaust after-treatment system, illustrating a reductant injector and a mounting assembly for the injector constructed in accordance with principles of the present disclosure.
Figure 3:
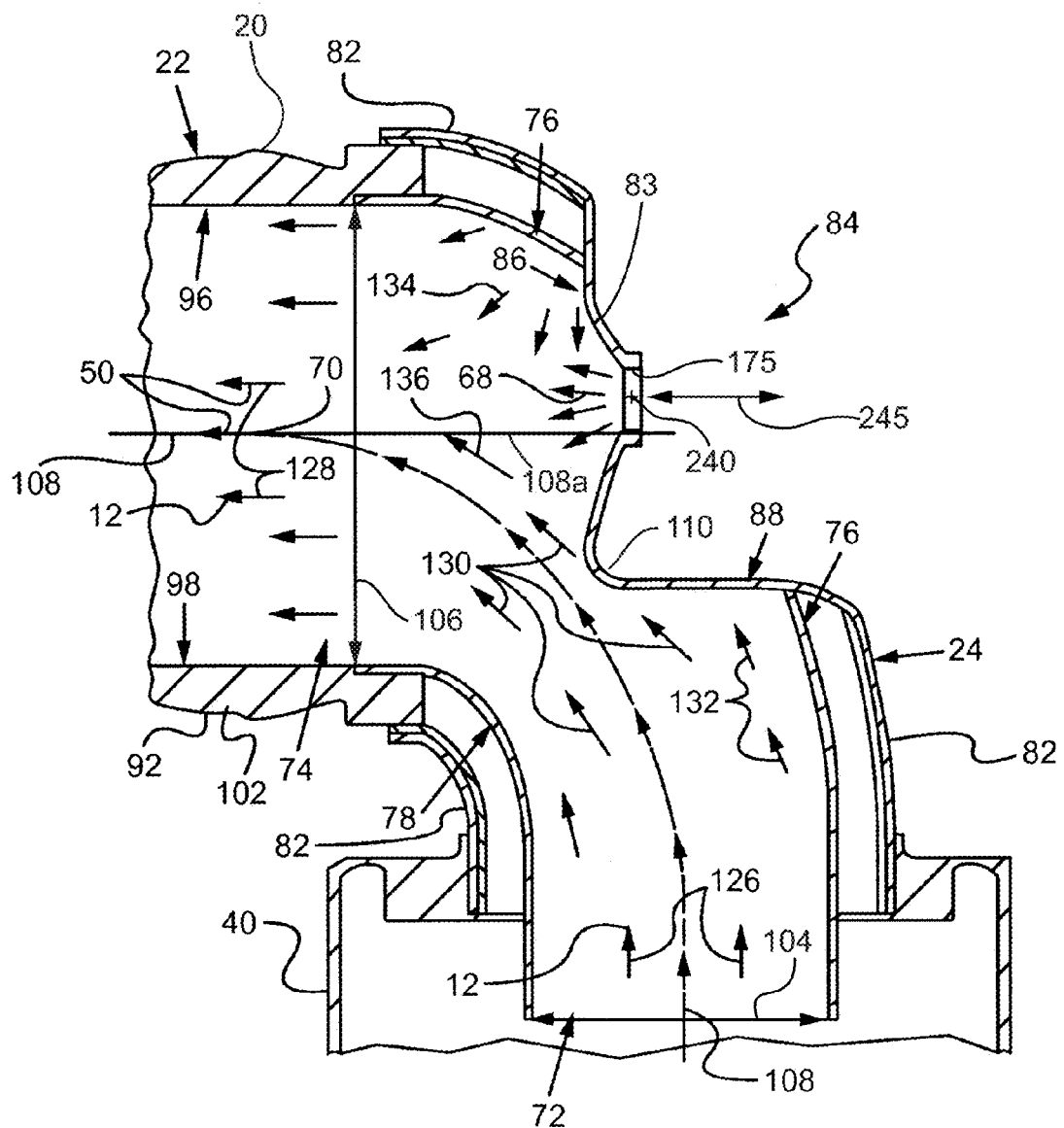
FIG. 3 is a cross-sectional view taken along line III-III in FIG. 2 of the exhaust line.
Figure 4:
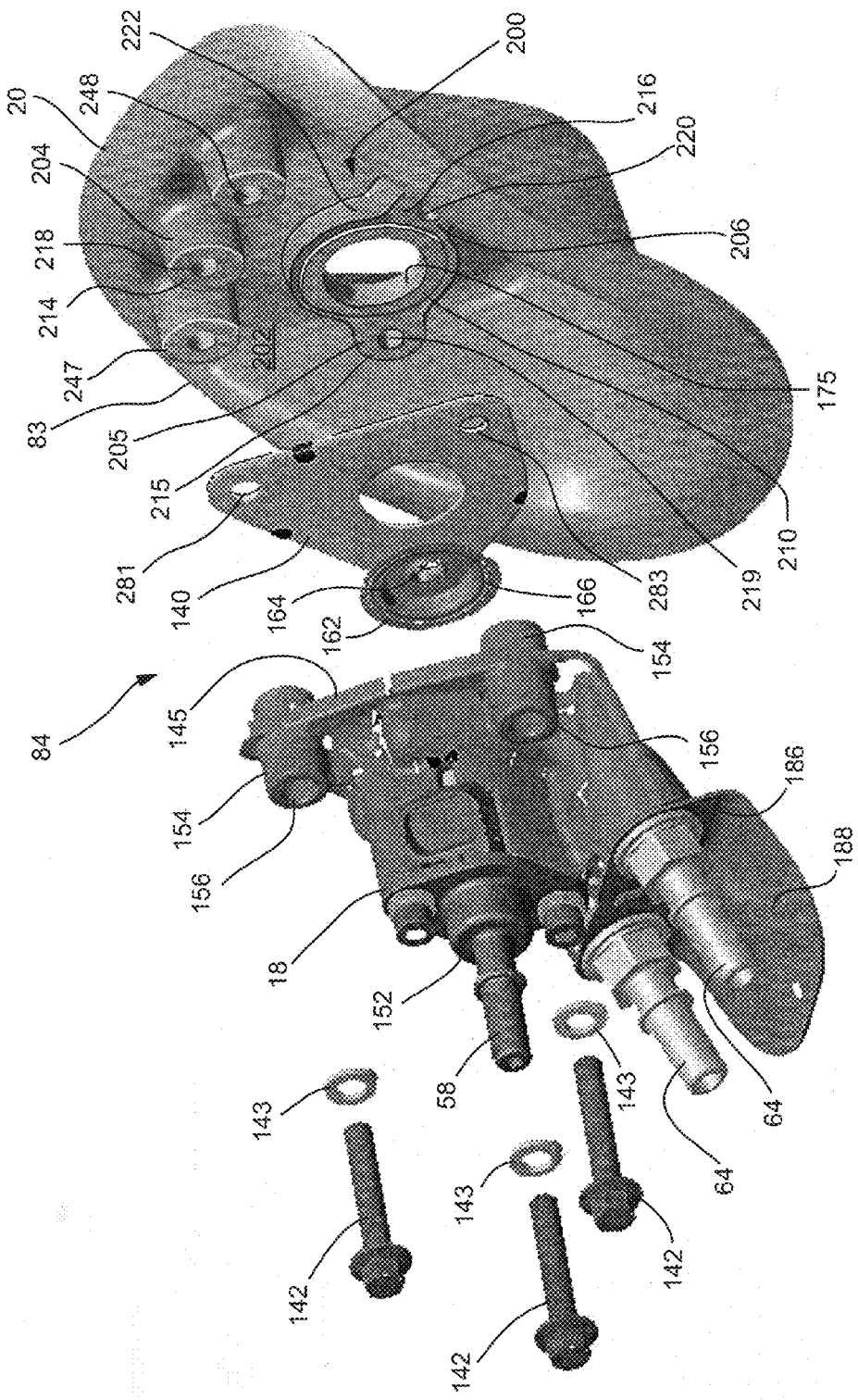
FIG. 4 is an exploded view of the injector and the injector mounting assembly of FIG. 2.

Referring to FIG. 2, the bend 24 of the exhaust line 20 can include a bend inlet end 72, a bend outlet end 74, a bend outer curve 76, a bend inner curve 78, and bend sides 80. The bend outer curve 76, the bend inner curve 78, and the bend sides 80 form a bent tube or box structure which is open at the bend inlet end 72 and the bend outlet end 74. The bend inlet end 72 joins to and is in fluid communication with the end 40 of the first canister 32. The bend outlet end 74 joins to and is in fluid communication with the straight conduit 22. The bend outer curve 76, the bend inner curve 78, and the bend sides 80 constitute walls of the exhaust line 20 exposed to the exhaust flow 12. Referring to FIGS. 3 and 4, the bend 24 can also include double walls 82 provided to increase the thermal protection of the injector 18 from the exhaust flow 12. The bend outer curve 76 includes an indent portion 83 which is adapted to define a recess within which the injector 18 can be mounted as described below.

An injector mounting assembly 84 for the injector 18 of the engine exhaust after-treatment system 10 is provided in the bend outer curve 76. The injector mounting assembly 84 includes the indent portion 83 of the exhaust line 20. The indent portion 83 includes a downstream wall 86, an upstream wall 88, and sidewalls 90, which together form a recessed pocket or area in the bend 24 (see FIGS. 2 and 3). The indent portion 83 can have a rounded triangular shape with a width at the upstream end greater than a width at the downstream end. The indent portion 83 can also have other shapes, including rectangular, cylindrical, or hemispherical.

Referring to FIGS. 2 and 3, the straight conduit 22 includes an upstream end 92, a downstream end 94 (see FIG. 1), an outer wall 96, an inner wall 98, and sides 100 that form a generally tubular pipe. The straight conduit 22, and other components, can be wrapped in insulation 102. The upstream end 92 joins to the bend outlet end 74.

Referring to FIGS. 2 and 3, the bend 24 has an inlet width 101 and an outlet width 103 where the outlet width 103 is smaller than the inlet width 101 such that the width of the bend 24 decreases from the bend inlet end 72 to the bend outlet end 74. Referring to FIG. 3, the bend 24 has an inlet depth 104 and an outlet depth 106 where the outlet depth 106 is greater than the inlet depth 104 such that the depth of the bend 24 increases gradually from the bend inlet end 72 to the bend outlet end 74. Because the relative sizes of the inlet width 101 to the outlet width 103 and the inlet depth 104 to the outlet depth 106 vary in opposite relation, a substantially constant flow area can be maintained. In other embodiments, the width and the depth of the bend 24 can be constant or vary differently. The outlet depth 106 and the outlet width 103 can substantially match the width or diameter of the straight conduit 22.

Referring to FIG. 3, an axial centerline 108 extends through the center of the bend 24 and continues through the straight conduit 22. The indent portion 83 extends into the bend 24 toward the axial centerline 108 and includes a maximum bend extension point 110. The maximum bend extension point 110 can be a point or region where the downstream wall 86 and the upstream wall 88 meet.

Referring to FIG. 3, the injector 18, when mounted to the indent portion 83 of the exhaust line 20, is adapted to discharge a spray 68 of the reductant 17 into the exhaust flow 12. The spray 68 can define an axis of symmetry 70. Absent any influence by the exhaust flow 12, the axis of symmetry 70 can be substantially parallel to and aligned with the third flow direction 50 of the exhaust flow 12 which is headed downstream to the SCR device 14.

FIG. 3 shows the direction of the exhaust flow 12 as it travels through the bend 24 into the straight conduit 22. The direction of the exhaust flow 12 includes a straight inlet direction 126, a straight outlet direction 128, and a central curved direction 130 between the straight inlet direction 126 and the straight outlet direction 128. Also included are blocked flow areas 132, 134 just upstream of the upstream wall 88 and just downstream of the downstream wall 86 in the corner where the downstream wall 86 meets the bend outer curve 76, respectively, of the indent portion 83.

The injector 18 can be mounted in the downstream wall 86 so that the reductant spray 68 is substantially aligned with the axis of symmetry 70 and the centerline 108 as it extends in the straight conduit 22. The indent portion 83 can also be sized to locate the axis of symmetry 70 to intersect with an intermediate direction 136 of the exhaust flow 12. The intermediate direction 136 is the direction of the exhaust flow 12 as it begins to straighten into the straight outlet direction 128 from the central curved direction 130. In other embodiments, the injector mounting assembly 84 can be adapted to mount the injector at a different orientation with respect to the straight conduit 22 and/or the straight outlet direction 128 of the exhaust flow 12.

Referring to FIG. 4, an exemplary embodiment of an injector mounting assembly 84 for an injector of an engine exhaust after-treatment system constructed in accordance with principles of the present disclosure and the reductant injector 18 are shown. The injector mounting assembly 84 includes the indent portion 83 of the exhaust line 20, a gasket 140 interposed between the indent portion 83 and the injector 18, and a plurality of fasteners 142 and a corresponding plurality of washers 143 configured to mount the reductant injector 18 to the exhaust line 20.

Figure 5:
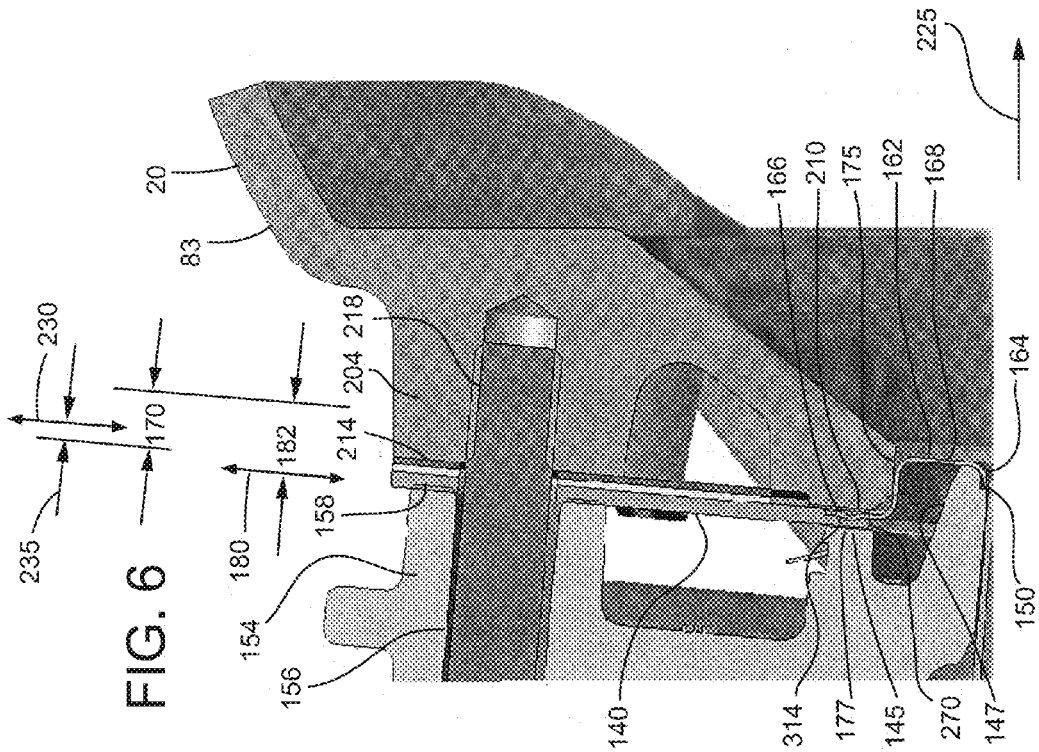
FIG. 5 is a side elevational view, in section, of the reductant injector and a mounting assembly for the injector of FIG. 2.
Figure 6:
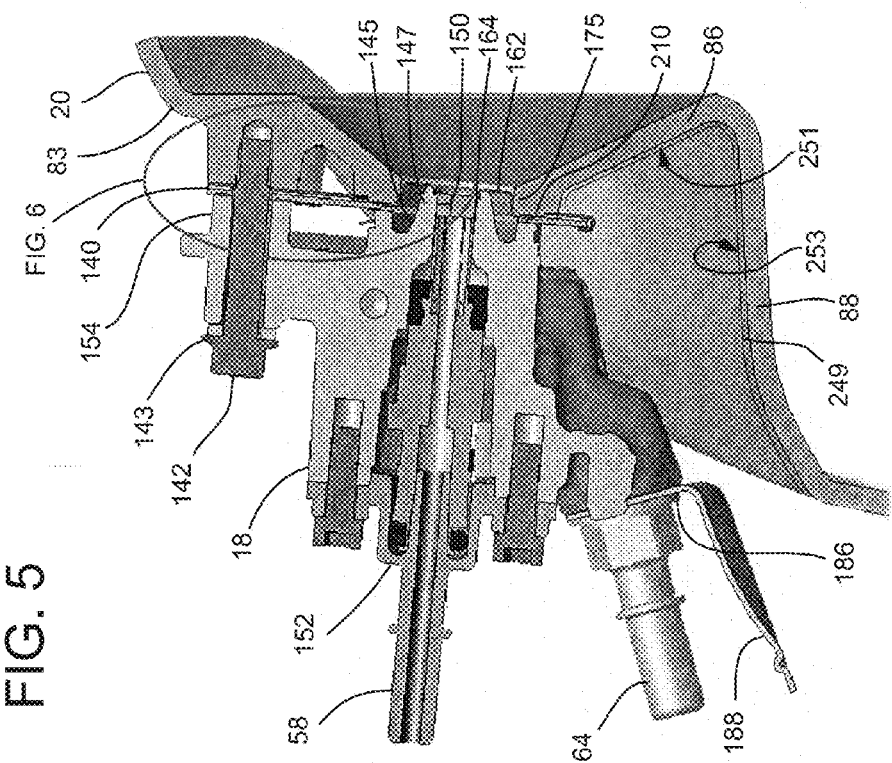
FIG. 6 is an enlarged, detail view taken from FIG. 5.

Referring to FIGS. 4-6, the reductant injector 18 can be mounted to the exhaust line 20 with the gasket 140 interposed therebetween. The injector 18 includes a mounting end 145 with a tip 147 having a nozzle 150 adapted to selectively discharge a spray 68 of the reductant 17. The reductant inlet connection 58 is positioned opposite the nozzle 150 at a reductant end 152 of the injector 18. The reductant inlet connection 58 is in fluid communication with the nozzle 150 such that the reductant 17 can be selectively emitted by the injector 18. The reductant injector 18 can be adapted to be selectively operated by an electronic control module as is known in the art. The injector 18 can include an internal, electrically-operated valve to permit adjustable dosing.

The reductant end 152 of the injector 18 can also include the coolant port connections 64. The coolant port connections 64 are adapted to fluidly connect the reductant injector 18 to the coolant source 60 so that coolant 62 can enter the injector 18 through one of the coolant port connections 64, flow through the injector 18 to cool the injector 18, and exit the injector 18 through the other of the coolant port connections 64 to return the warmed coolant to the coolant source 60.

Figure 7:
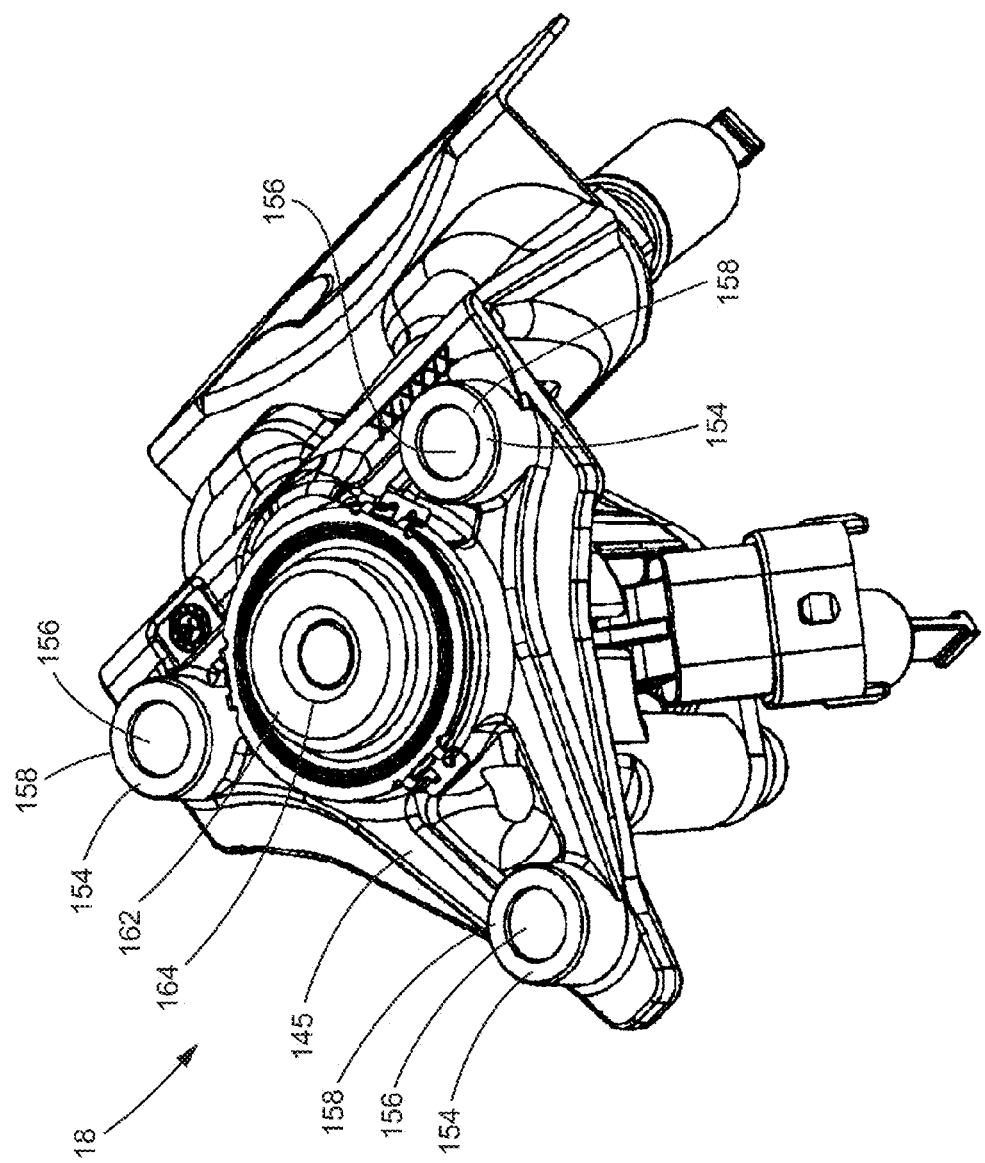
FIG. 7 is a perspective view of an embodiment of a reductant injector suitable for use with principles of the present disclosure.

Referring to FIGS. 4 and 7, the mounting end 145 of the injector 18 can further include a plurality of mounting feet 154 which are configured to permit the injector 18 to be removably coupled to the exhaust line 20 using the fasteners 142 and the washers 143. The illustrated injector 18 includes three mounting feet 154. The mounting feet 154 are disposed in spaced relationship to each other. The nozzle 150 is disposed between the mounting feet 154 (see FIG. 7). The mounting feet 154 each defines a through bore 156. At the mounting end 145, the mounting feet 154 each includes a distal mounting surface 158 which circumscribes the through bore 156.

Referring to FIGS. 4-7, the reductant injector 18 includes a sealing plate 162 that is removably mounted to the nozzle 150. The sealing plate 162 defines a nozzle opening 164 and can be mounted to the tip 147 such that the nozzle opening 164 is aligned with the nozzle 150.

Referring to FIG. 6, the sealing plate 162 includes a peripheral flange 166 and an end face 168. The end face 168 defines the nozzle opening 164. The peripheral flange 166 of the sealing plate 162 can be placed in sealing engagement with the gasket 140 when the reductant injector 18 is mounted to the exhaust line 20 with the gasket 140 interposed therebetween. The end face 168 of the sealing plate 162 is disposed in axial offset relationship to the peripheral flange 166, being separated by an axial offset distance 170. The axial offset relationship between the end face 168 and the peripheral flange 166 permits the end face 168 to be disposed within an injector passage 175 of the exhaust line 20. The gasket 140 is in sealing engagement with the peripheral flange 166 of the sealing plate 162.

Referring to FIGS. 5 and 6, the tip 147 can include a mounting surface 177 which is generally annular and circumscribes the nozzle 150. The mounting surface 177 of the tip 147 is adapted to be placed in engagement with the peripheral flange 166 of the sealing plate 162. The distal mounting surfaces 158 of the mounting feet 154 and the mounting surface 177 of the of the tip 147 of the injector 18 can define an injector mounting plane 180 can terminate at a plane that is positioned adjacent the nozzle 150. The end face 168 is disposed in offset relationship with respect to the injector mounting plane 180 by an axial nozzle distance 182.

Referring to FIGS. 4 and 5, the injector 18 includes a heat shield 186 configured to help thermally isolate the injector 18 from the exhaust line 20. The heat shield 186 projects from the body of the injector 18 and includes a flange 188 that extends beneath the coolant port connections 64.

Referring to FIGS. 4-6, the indent portion 83 of the exhaust line 20 can be configured to protect the injector 18 from the high temperatures of the exhaust flow 12 while reducing recirculation flow in the passageway, to thereby help prevent deposits of the reductant 17 from forming. Referring to FIG. 4, the indent portion 83 of the exhaust line 20 includes an exterior surface 200 having a mounting surface 202 with a plurality of mounting bosses 204, 205, 206 projecting therefrom and a sealing surface 210 defining the injector passage 175. The plurality of mounting bosses 204, 205, 206 each includes a distal mounting face 214, 215, 216. Each mounting boss 204, 205, 206 defines a blind bore 218, 219, 220 which is open to the respective distal mounting face 214, 215, 216. Each blind bore 218, 219, 220 can include an internal threaded surface adapted to threadingly engage one of the fasteners 142.

Referring to FIGS. 4-6, the plurality of mounting bosses 204, 205, 206 are positioned to align with a corresponding one of the mounting feet 154 of the injector 18. The plurality of mounting bosses 204, 205, 206 and the injector passage 175 are configured such that, when the injector 18 is mounted to the exhaust line 20, the distal mounting surfaces 158 of the mounting feet 154 are respectively aligned with the corresponding distal mounting faces 214, 215, 216 of the mounting bosses 204, 205, 206 (see FIG. 6 also). Each through bore 156 of the mounting feet 154 is respectively aligned with the blind bore 218, 219, 220 of an associated mounting boss 204, 205, 206. In the illustrated embodiment, the sealing surface 210 and two of the mounting bosses 205, 206 are included in a common central hub 222 such that the two mounting bosses 205, 206 are in the form of mounting ears.

The sealing surface 210 circumscribes the injector passage 175, which is configured to provide fluid communication between the injector nozzle 150 and the passageway of the exhaust line 20. The distal mounting faces 214, 215, 216 of the mounting bosses 204, 205, 206 of the exhaust line define an exhaust line mounting plane 230 (see FIG. 6). The sealing surface 210 of the exhaust line 20 is disposed in axial offset relationship to the exhaust line mounting plane 230 and the distal mounting faces 214, 215, 216 of the mounting bosses 204, 205, 206 by a seal surface offset distance 235.

The injector passage 175 is in fluid communication with the nozzle 150 of the injector 18 such that the reductant 17 emitted from the nozzle 150 of the injector 18 enters the exhaust line 20 and travels in an exhaust flow direction 225 toward the downstream end of the exhaust line 20. The injector passage 175, and therefore the injector nozzle 150, can be positioned and oriented to promote mixing of the reductant 17 with the exhaust flow 12 as it traverses through the exhaust line into the straight conduit 22. Referring to FIG. 3, in the illustrated embodiment, for example, a center 240 of the injector passage 175 is positioned above the part of the centerline 108 in the straight conduit 22, as best shown with the centerline extension 108a shown in FIG. 3. The injector passage 175 is oriented so that an injector passage centerline 245 is disposed in offset relationship to the centerline 108 of the straight conduit 22. For example, the center 240 of the injector passage 175 can be approximately 10 millimeters above the centerline extension 108a. In embodiments, the injector passage centerline 245 can be disposed at variable positions with respect to the centerline 108 of the straight conduit 22 of the exhaust line 20. For example, in embodiments, the injector passage centerline 245 can extend at an angle of approximately five degrees with respect to the centerline 108 of the straight conduit 22. The location and orientation of the injector passage 175 can be varied to promote the mixing of the spray 68 of the reductant 17 and the exhaust flow 12.

Referring to FIGS. 4 and 5, anchor bosses 247, 248 can also project from the exterior surface 200 of the indent portion 83 to provide a mounting structure for securing a layer of insulation 249 over an exterior surface 251 of the downstream wall 86 as well as an exterior surface 253 of the upstream wall 88 (see FIG. 5). The layer of insulation 249 can be formed of a thermal insulating material, such as a silicate fiber mat encased with a stainless steel foil.

The gasket 140 is provided not only to thermally isolate the mounting feet 154 of the injector 18 from the mounting bosses 204, 205, 206 of the exhaust line 20, but also to thermally isolate the tip 147 of the injector 18 from the exhaust line 20 and to provide a sealing engagement between the sealing plate 162 of the injector 18 and the exhaust line 20. The gasket 140 is adapted to be mounted to the exhaust line 20. The gasket 140 can be interposed between the mounting feet 154 of the injector 18 and the mounting bosses 204, 205, 206 of the exhaust line 20 and between the tip 147 of the injector 18 and the sealing surface 210 of the exhaust line 20 to further insulate the injector 18 from the heat of the exhaust flow 12 when coupled to the exhaust line 20.

Referring to FIGS. 8-10, the gasket 140 defines a nozzle aperture 270 therein. The nozzle aperture 270 has a gasket nozzle opening diameter 272 that is configured to permit the end face 168 of the sealing plate 162 therethrough. The nozzle aperture 270 is slightly larger than the injector passage 175 of the exhaust line (see FIG. 6).

Referring to FIGS. 8-10, the gasket 140 defines a plurality of fastener apertures 281, 282, 283. The fastener apertures 281, 282, 283 are configured to receive a respective fastener 142 therethrough. The fastener apertures 281, 282, 283 are arranged to be in respective alignment with the blind bore 218, 219, 220 of the mounting bosses 204, 205, 206 of the exhaust line 20.

The illustrated gasket includes a thermal insulation layer 291 and a shim layer 292. The thermal insulation layer 291 and the shim layer 292 can be secured together using any suitable technique. For example, in the illustrated embodiment, the shim layer 292 include a plurality of mounting clips 294 which can be bent over the thermal insulation layer 291 to secure the layers 291, 292 together. In other embodiments, other techniques (e.g., gluing) can be used.

The thermal insulation layer 291 can be configured to sealingly contact the injector 18 and the exhaust line 20. The thermal insulation layer 291 comprises an insulative material, such as vermiculite, for example, and includes an injector mating surface 296. In embodiments, the thermal insulation layer 291 of the gasket 140 can be formed of a suitable insulative material having a heat conductivity which is lower than the heat conductivity of the material of the exhaust line 20. The thermal insulation layer 291 has an insulation thickness 298.

The shim layer 292 is configured to engagingly contact the distal mounting faces 214, 215, 216 of the mounting bosses 204, 205, 206 of the exhaust line 20 such that the thermal insulation layer 291 is positioned to sealingly engage the injector 18 and the exhaust line 20. The illustrated shim layer 292 comprises a metal.

The illustrated shim layer 292 includes a plurality of plies 301, 302. In embodiments, the outer ply 302 can include the mounting clips 294, and the inner ply 301 can be formed without clips.

The shim layer 292 has a shim thickness 305. In embodiments, the shim thickness 305 is configured to permit the sealing band 314 of the thermal insulation layer 291 to provide a sealing engagement with the sealing surface 210 of the exhaust line 20. In embodiments, the shim thickness 305 is substantially equal to the seal surface offset distance 235.

The shim layer 292 defines a clearance aperture 310. The clearance aperture 310 is larger than the nozzle aperture 270 and circumscribes the nozzle aperture 270. The clearance aperture 310 is configured such that a sealing band 314 is defined between the clearance aperture 310 and the nozzle aperture 270 on an exhaust line mating surface 312 of the insulation layer 291, which is in opposing relationship to the injector mating surface 296. The sealing band 314 of the gasket 140 is adapted to engage the sealing surface 210 of the exhaust line 20. In embodiments, the sealing band 314 is substantially the same size as the sealing surface 210 of the exhaust line 20. In embodiments, the sealing band 314 is slightly larger than the sealing surface 210 of the exhaust line 20 such that the gasket 140 can be mounted to the exhaust line 20 with the sealing band 314 in circumscribing relationship to the sealing surface 210.

The clearance aperture 310 has a clearance diameter 318. In embodiments, a ratio of the clearance diameter 318 to the gasket nozzle opening diameter 272 is at least about 1.25, and at least about 1.5 in other embodiments. In other embodiments, ratio of the clearance diameter 318 to the gasket nozzle opening diameter 272 can be about 1.7. In still other embodiments, a different ratio of the clearance diameter 318 to the gasket nozzle opening diameter 272 can be used.

In embodiments, the gasket 140 can omit the shim layer 292 depending upon the configuration of the mounting surfaces between which it is interposed. For example, in embodiments where the sealing surface 210 of the exhaust line 20 is disposed in substantially aligned relationship with the exhaust line mounting plane 230 and the distal mounting faces 214, 215, 216 of the mounting bosses 204, 205, 206, the shim layer 292 can be omitted.

Referring to FIG. 6, the gasket 140 can be mounted to the exhaust line 20 such that the nozzle aperture 270 is substantially aligned with the injector passage 175 of the exhaust line 20. The gasket 140 is configured such that, when the injector 18 is mounted to the exhaust line 20, the gasket 140 is interposed between the distal mounting surfaces 158 of each of the mounting feet 154 and the corresponding distal mounting faces 214, 215, 216 of the mounting bosses 204, 205, 206 of the exhaust line 20. The gasket 140 is in sealing engagement with the sealing surface 210 of the exhaust line 20 and the sealing plate 162 of the injector 18 and the mounting surface 177 of the tip 147. The tip 147 of the injector 18 is aligned with the nozzle aperture 270 of the gasket 140, and the nozzle 150 extends through the nozzle aperture 270 of the gasket 140.

Referring to FIGS. 4-6, each fastener is adapted to extend through the through bore 156 of one of the mounting feet 154 and through an associated fastener aperture 281, 282, 283 of the gasket 140 and to retentively engage the blind bore 218, 219, 220 of the associated mounting boss 204, 205, 206 to mount the injector 18 to the exhaust line 20. One of the washers 143 can be associated with each fastener 142 to enhance the retentive engagement between the injector 18 and the exhaust line 20.

INDUSTRIAL APPLICABILITY

Embodiments of an injector mounting assembly 84 and an engine exhaust after-treatment system 10 for a power system of a machine are described herein. The industrial applicability of embodiments of an injector mounting assembly 84 and an engine exhaust after-treatment system 10 for a power system of a machine constructed according to principles of the present disclosure will be readily appreciated from the foregoing discussion. The described principles are applicable for use in multiple embodiments of a machine, including on-highway trucks or vehicles, off-highway trucks or machines, earth moving equipment, generators, aerospace applications, locomotive applications, marine applications, pumps, stationary equipment, or other engine powered applications In embodiments, the injector mounting assembly 84 for an injector 18 of an engine exhaust after-treatment system 10 can help prevent overheating of the injector tip 147 by removing the injector 18 from direct contact with the exhaust flow 12. The addition of a gasket 140 under the injector mounting feet 154 and the sealing area of the injector tip 147 help reduce the temperature of the injector 18 in the area of internal injector components that can be sensitive to high temperatures (e.g., an injector grommet, o-ring, and valve filter). In embodiments, a gasket 140 constructed in accordance with principles of the present disclosure not only thermally isolates the mounting feet 154 of the injector 18 from the mounting bosses 204, 205, 206 of the exhaust line 20, but also thermally isolates and sealingly engages a sealing area of an injector tip 147 to thereby help reduce injector temperatures.

The reductant injector 18 can be exposed to high temperature during hot shutdowns. The addition of a gasket 140 under the injector mounting feet 154 and the sealing area of the injector tip 147 can help prevent the temperatures of the injector 18 from exceeding target temperature limits after a hot shutdown without the need to follow complicated shutdown procedures. The added thermal protection provided by following principles of the present disclosure can help avoid the need to employ additional delayed engine shutdown strategies to meet target injector temperature limits. The gasket 140 can help to thermally isolate the injector 18 from the exhaust line 20 and to provide a seal to help prevent hot exhaust from leaking from the mounting assembly 84.

Additional measures, such as the configuration of the injector passage 175 and the layer of insulation 249 and the gasket 140 provide additional thermal isolation of the injector 18 from the exhaust flow 12. For example, in embodiments, the injector passage 175 moves the injector 18 by a recess distance away from the exhaust flow, such as approximately twelve to twenty-five millimeters, thereby to reduce the heat to the injector tip 147 due to direct exposure of the injector 18 to the high temperatures of the exhaust flow 12.

It will be appreciated that the foregoing description provides examples of the disclosed system and technique. However, it is contemplated that other implementations of the disclosure can differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. An injector mounting assembly for an injector of an engine exhaust after-treatment system, the injector including a mounting end having a plurality of mounting feet disposed in spaced relationship to each other, a tip with a nozzle disposed between the plurality of mounting feet, and a sealing plate defining a nozzle opening and mounted to the tip such that the nozzle opening is aligned with the nozzle, the plurality of mounting feet each including a distal mounting surface, the injector mounting assembly comprising:

an exhaust line defining a passageway having an upstream end and a downstream end in fluid communication with the upstream end, the exhaust line adapted to receive an exhaust flow from an engine at the upstream end and to discharge the exhaust flow from the downstream end, the exhaust line including an exterior surface having a mounting surface with a plurality of mounting bosses projecting therefrom and a sealing surface defining an injector passage, the plurality of mounting bosses each including a distal mounting face, the plurality of mounting bosses and the injector passage configured such that, when the injector is mounted to the exhaust line, the distal mounting surface of each of the plurality of mounting feet is respectively aligned with a corresponding distal mounting face of the plurality of mounting bosses and the injector passage is in fluid communication with the nozzle of the injector such that reductant emitted from the nozzle of the injector enters the exhaust line and travels in an exhaust flow direction toward the downstream end; and a gasket mounted to the exhaust line, the gasket defining a nozzle aperture therein, the nozzle aperture aligned with the injector passage of the exhaust line, and the gasket configured such that, when the injector is mounted to the exhaust line, the gasket is interposed between the distal mounting surface of each of the plurality of mounting feet and the corresponding distal mounting face of the plurality of mounting bosses of the exhaust line, the gasket is interposed between, and in sealing engagement with, the sealing surface of the exhaust line and the sealing plate of the injector, and the nozzle aperture of the gasket is aligned with the nozzle of the injector.

2. The injector mounting assembly according to claim 1, wherein the sealing plate of the injector includes a peripheral flange and an end face, the end face disposed in axial offset relationship to the peripheral flange within the injector passage of the exhaust line and defining the nozzle opening, and wherein the gasket is in sealing engagement with the peripheral flange of the sealing plate.

3. The injector mounting assembly according to claim 1, wherein the plurality of mounting bosses each defines a blind bore therein, the gasket defines a plurality of fastener apertures, the plurality of fastener apertures configured in respective alignment with the blind bore of each of the plurality of mounting bosses.

4. The injector mounting assembly according to claim 3, wherein the plurality of mounting feet of the injector each defines a through bore, the plurality of mounting bosses configured such that, when the injector is mounted to the exhaust line, each through bore of the plurality of mounting feet is respectively aligned with the blind bore of one of the plurality of mounting bosses, the injector mounting assembly further comprising:

a plurality of fasteners, each fastener adapted to extend through the through bore of one of the plurality of mounting feet and through an associated fastener aperture of the gasket and to retentively engage the blind bore of one of the plurality of mounting bosses to mount the injector to the exhaust line.

5. The injector mounting assembly according to claim 1, wherein the gasket includes a thermal insulation layer and a shim layer, the thermal insulation layer comprising an insulative material and including an injector mating surface, the shim layer configured to engagingly contact the exhaust line such that the injector mating surface of the thermal insulation layer is positioned to sealingly engage the injector and the exhaust line.

6. The injector mounting assembly according to claim 5, wherein the shim layer comprises a metal.

7. The injector mounting assembly according to claim 5, wherein the shim layer includes a plurality of plies.

8. The injector mounting assembly according to claim 5, wherein the sealing surface of the exhaust line is disposed in axial offset relationship to the distal mounting face of each of the plurality of mounting bosses of the exhaust line by an axial offset distance, and the shim layer has a thickness equal to the axial offset distance.

9. The injector mounting assembly according to claim 5, wherein the shim layer defines a clearance aperture, the clearance aperture being larger than the nozzle aperture and circumscribing the nozzle aperture, the thermal insulation layer including an exhaust line mating surface, the clearance aperture configured such that a sealing band is defined on the exhaust line mating surface between the clearance aperture and the nozzle aperture, the sealing band of the gasket engaging the sealing surface of the exhaust line.

10. The injector mounting assembly according to claim 9, wherein the clearance aperture has a clearance diameter, and the nozzle aperture has a nozzle opening diameter, wherein a ratio of the clearance diameter to the nozzle opening diameter is at least 1.5.

11. An engine exhaust after-treatment system comprising:

an exhaust line defining a passageway having an upstream end and a downstream end in fluid communication with the upstream end, the exhaust line adapted to receive an exhaust flow from an engine at the upstream end and to discharge the exhaust flow from the downstream end, the exhaust line including an exterior surface having a mounting surface with a plurality of mounting bosses projecting therefrom and a sealing surface defining an injector passage, the plurality of mounting bosses each including a distal mounting face;

a gasket mounted to the exhaust line, the gasket defining a nozzle aperture therein, the nozzle aperture aligned with the injector passage of the exhaust line; and a reductant injector mounted to the exhaust line with the gasket interposed therebetween, the reductant injector including a mounting end having a plurality of mounting feet disposed in spaced relationship to each other, a tip with a nozzle disposed between the plurality of mounting feet, and a sealing plate defining a nozzle opening and mounted to the tip such that the nozzle opening is aligned with the nozzle, the plurality of mounting feet each including a distal mounting surface, the reductant injector mounted to the exhaust line such that the distal mounting surface of each of the plurality of mounting feet is respectively aligned with a corresponding distal mounting face of the plurality of mounting bosses and the nozzle of the reductant injector extends through the nozzle aperture of the gasket and is in fluid communication with the injector passage of the exhaust line such that reductant emitted from the nozzle of the reductant injector enters the exhaust line and travels in an exhaust flow direction toward the downstream end;

wherein the gasket is configured such that the gasket is interposed between the distal mounting surface of each of the plurality of mounting feet and the corresponding distal mounting face of the plurality of mounting bosses of the exhaust line, and the gasket is interposed between, and in sealing engagement with, the sealing surface of the exhaust line and the sealing plate of the reductant injector.

12. The engine exhaust after-treatment system according to claim 11, further comprising:

a selective catalytic reduction device disposed in the passageway of the exhaust line downstream of the reductant injector.

13. The engine exhaust after-treatment system according to claim 12, wherein the sealing plate of the reductant injector includes a peripheral flange and an end face, the end face disposed in axial offset relationship to the peripheral flange within the injector passage of the exhaust line and defining the nozzle opening, and wherein the gasket is in sealing engagement with the peripheral flange of the sealing plate.

14. The engine exhaust after-treatment system according to claim 12, wherein the reductant injector is mounted to the exhaust line by a plurality of fasteners, the plurality of mounting bosses of the exhaust line each defines a blind bore therein, the gasket defines a plurality of fastener apertures respectively aligned with the blind bore of each of the plurality of mounting bosses, the plurality of mounting feet of the reductant injector each defines a through bore respectively aligned with one of the plurality of fastener apertures of the gasket and the blind bore of one of the plurality of mounting bosses, wherein each fastener extends through the through bore of one of the plurality of mounting feet and one of the plurality of fastener apertures of the gasket and retentively engages the blind bore of one of the plurality of mounting bosses.

15. The engine exhaust after-treatment system according to claim 12, further comprising:

a reductant source in fluid communication with the reductant injector;

a pump adapted to selectively deliver reductant to the reductant injector from the reductant source.

16. The engine exhaust after-treatment system according to claim 15, further comprising:

a particulate filter disposed in the passageway of the exhaust line upstream of the selective catalytic reduction device.

17. The engine exhaust after-treatment system according to claim 12, wherein the gasket includes a thermal insulation layer and a shim layer, the thermal insulation layer comprising an insulative material and including an injector mating surface, the shim layer configured to engagingly contact the exhaust line such that the injector mating surface of the thermal insulation layer is positioned to sealingly engage the reductant injector and the exhaust line.

18. The engine exhaust after-treatment system according to claim 17, wherein the sealing surface of the exhaust line is disposed in axial offset relationship to the distal mounting face of each of the plurality of mounting bosses of the exhaust line by an axial offset distance, and the shim layer has a thickness equal to the axial offset distance.

19. The engine exhaust after-treatment system according to claim 17, wherein the shim layer defines a clearance aperture, the clearance aperture being larger than the nozzle aperture and circumscribing the nozzle aperture, the thermal insulation layer including an exhaust line mating surface, the clearance aperture configured such that a sealing band is defined on the exhaust line mating surface between the clearance aperture and the nozzle aperture, the sealing band of the gasket engaging the sealing surface of the exhaust line.

20. The engine exhaust after-treatment system according to claim 19, wherein the clearance aperture has a clearance diameter, and the nozzle aperture has a nozzle opening diameter, wherein a ratio of the clearance diameter to the nozzle opening diameter is at least 1.5.

\* \* \* \* \*